Sept. 11, 1956     W. S. MORGAN     2,762,129
FISHING LINE MEASURING ATTACHMENT FOR FISHING RODS
Filed Dec. 27, 1954     2 Sheets-Sheet 2
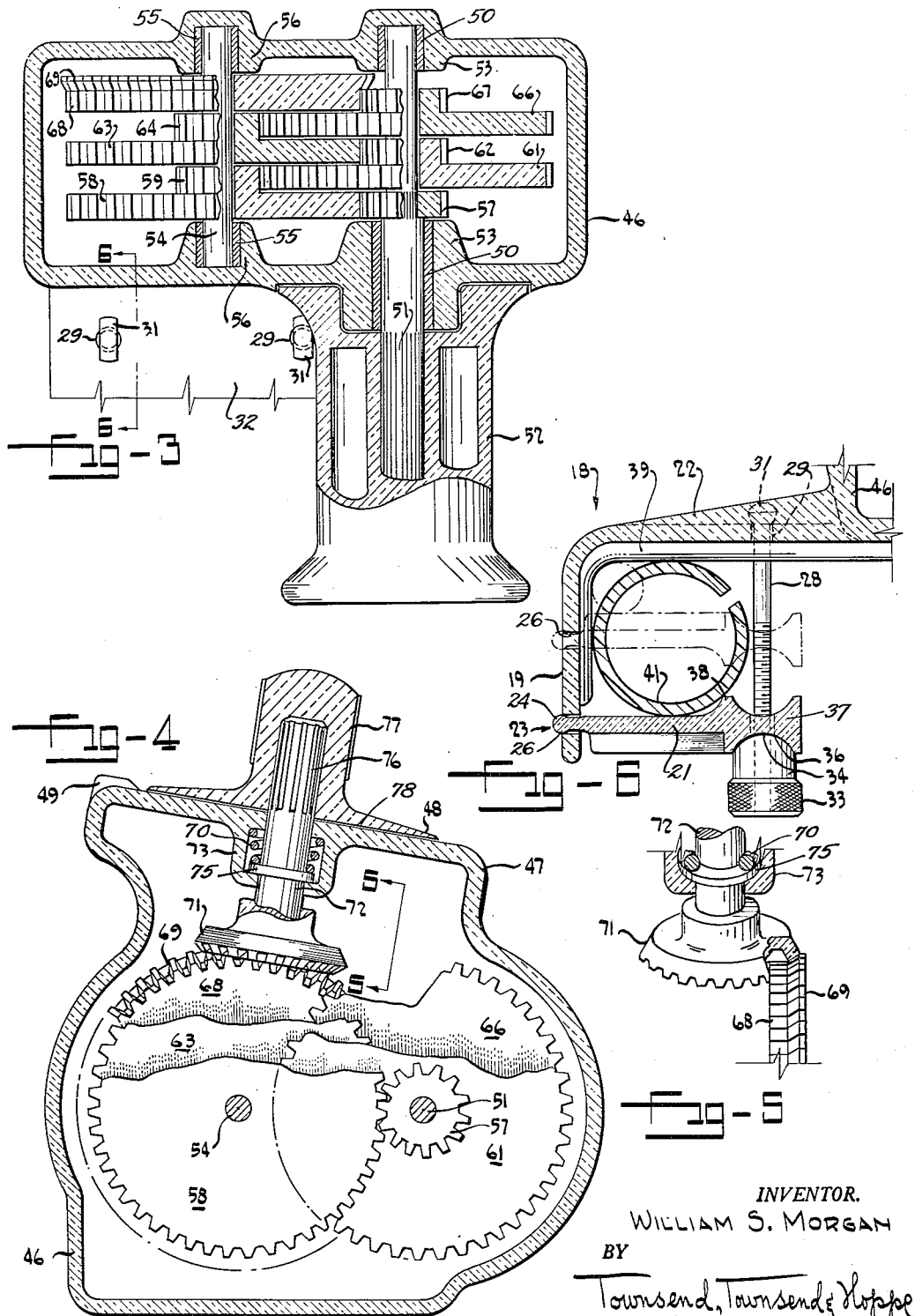
INVENTOR.
WILLIAM S. MORGAN
BY
Townsend, Townsend & Hoppe
ATTORNEYS United States Patent Office 2,762,129
Patented Sept. 11, 1956

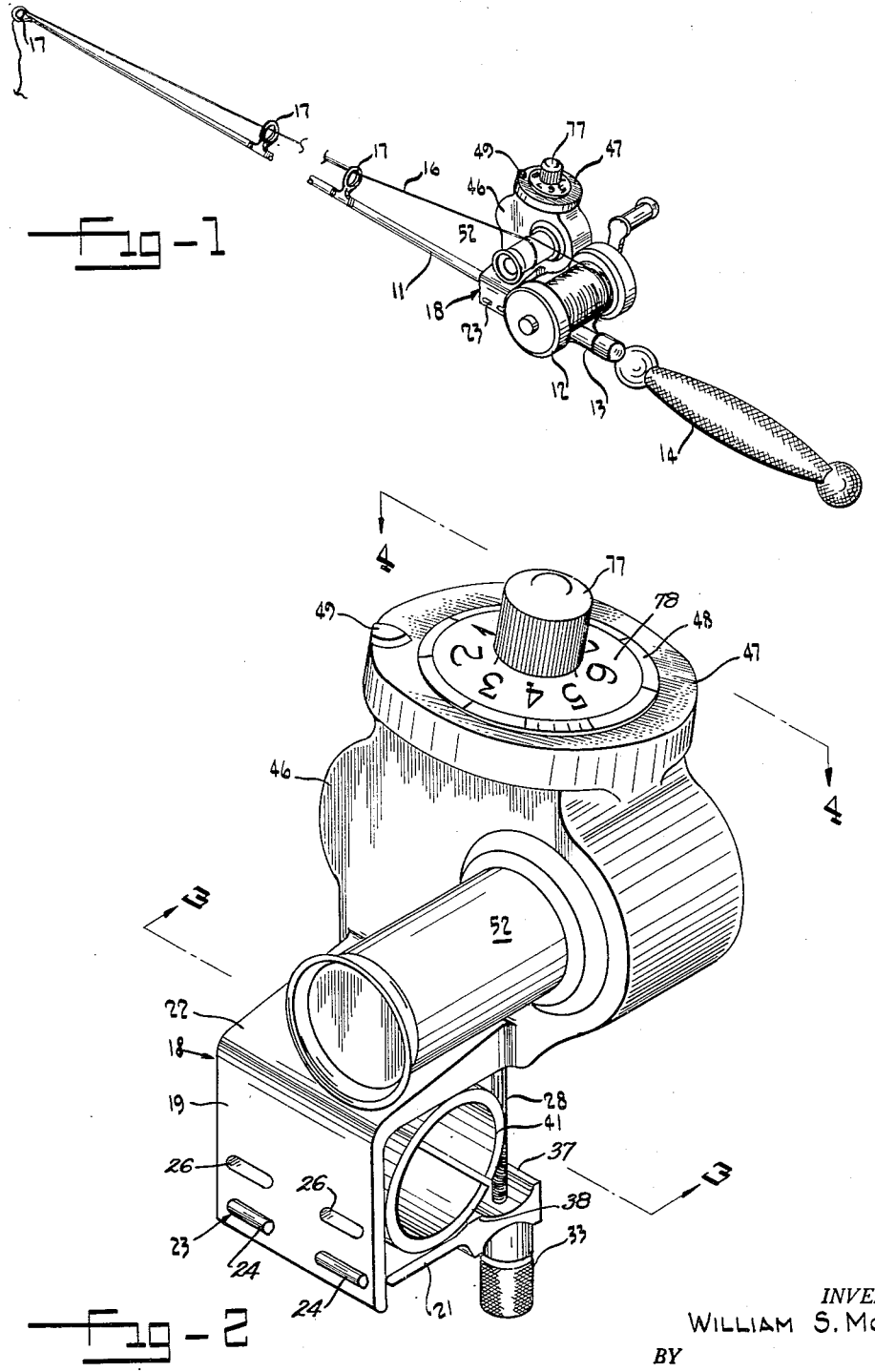

2,762,129

FISHING LINE MEASURING ATTACHMENT FOR FISHING RODS

William S. Morgan, San Mateo, Calif., assignor to Production Lathe, Inc., Burlingame, Calif., a corporation of California Application December 27, 1954, Serial No. 477,644

1 Claim. (Cl. 33—129)

This invention relates to a new and improved fishing line measuring attachment for fishing rods. More particularly, the invention comprises an instrument around which a fishing line can be temporarily wound as the line runs off a conventional fishing reel in order to measure the length of line which has been payed out from the reel. Information as to how much line has been reeled off and how much remains on the reel is of interest to fishermen for various purposes which form no part of the present invention.

One of the features of the present invention is the fact that it provides a pointer and dial which are readily accessible to the fisherman, directly indicating the quantity of line reeled off.

An additional feature of the invention is the fact that the line is detachable from the present device so that, after a predetermined quantity of line has been reeled off, the line may be disengaged from the measuring device. Thereafter, the measuring device does not interfere with reeling in the line after a strike has been made.

Another feature of the invention is the fact that the pointer can be reset relative to the indications on the dial to any desired reading whenever required.

A further feature of the invention is the fact that the reading of the dial is directly dependent on the actual length of line which is run off the reel rather than dependent upon the number of times that the reel revolves. It will be understood that when line is wrapped around a reel, the quantity of line which is stripped per turn of the reel is greater when a large quantity of line is on the reel than when only a small quantity remains, because the circumference of the line wrapped around the reel varies. In accordance with the present invention, the reading is not dependent upon the quantity of line remaining on the reel.

Still another feature of the invention is that it may be readily attached to a variety of different types and sizes of rods.

Still another feature of the invention is the fact that it can be constructed substantially entirely of plastic and thus is easy and inexpensive to manufacture.

Inasmuch as the gears employed in the device are fabricated of plastic, the device is relatively noiseless and no lubrication is required.

Other objects of the present invention will become apparent upon reading the following specification and referring to the accompanying drawings in which similar characters of reference represent corresponding parts in each of the several views.

Fig. 1 is a perspective view of the device attached to a fishing rod.

Fig. 2 is an enlarged perspective view of the device.

Fig. 3 is a section taken substantially along the line 3—3 of Fig. 2.

Fig. 4 is a section taken substantially along the line 4—4 of Fig. 2.

Fig. 5 is a fragmentary view through a portion of the gear train taken substantially along the line 5—5 of Fig. 4.

Fig. 6 is a fragmentary sectional view taken substantially along the line 6—6 of Fig. 3.

The type of fishing tackle used in connection with this invention is subject to wide variation, as will be well understood. In Fig. 1 a rod 11 is illustrated provided with a reel 12 located on a tubular portion 13 of the rod immediately above the handle 14. A line 16 wound around the reel 12 passes through line guides 17. The instant device is installed on the tubular portion 13 immediately above reel 12.

The instrument is contained in a casing preferably of plastic having an integral, projecting, L-shaped arm 18. To the lower, free leg 19 of the L-shaped arm 18 is hingedly attached a clamp arm 21 which extends generally parallel to the outward extending leg 22 of the L-shaped arm. The hinge connection 23 between leg 19 and clamp arm 21 is illustrated particularly in Fig. 6, it being understood that other means may be employed. The hinge 23 shown in Fig. 6 is formed by enlarged cylindrical termini 24 on the outer end of clamp arm 21 fitting into sets of slots 26 in the leg 19. The clamp arm 21 and leg 19 are thereby held in hinged engagement so long as the clamp arm 21 is substantially parallel to the leg 22. In order to draw the clamp arm 21 toward leg 22 a pair of bolts 28 pass through holes 29 in leg 22, the ends 31 of the bolts being enlarged to secure bolts 28 in place. Knurled nuts 33 having rounded upper ends 34 are threaded on the lower ends of bolts 28, the rounded ends of the nuts engaging in sockets 36 in the inner end 37 of clamp arm 21 so that as the nuts 33 are tightened, they bear against the sockets 34 and draw the clamp arm 21 toward leg 22, pivoting about hinge 23 and tightening against the rod. On the inner surface of clamp arm 21 is ridge 38 which extends in a direction parallel to the axis of the rod 11 and bears against the rod. Other ridges 39 on the inner surface of legs 12 and 22 assist in gripping the rod and preventing end-wise movement thereof.

As illustrated in Figs. 2 and 6, a split sleeve adapter 41 is installed within bracket arm 21 to accommodate rods of lesser diameter. As pressure is applied on the clamp arm 21, the sleeve 41 contracts and grips the rod. If a larger diameter rod is employed, adapter 41 can be eliminated. Selection of the proper holes 26 likewise accommodates different sizes of rods.

The casing is formed with a gear-housing portion 46 rounded on either side thereof to accommodate the gears contained therein, as hereinafter explained. On the upper end of the gear-housing casing is a circular boss 47, the outer surface of which is provided with pointer 49 which cooperates with a dial marker indications 48 to indicate the amount of line which has been reeled off.

Projecting out through the side of the gear-casing 46 is a spindle 51, the outer end of which carries a capstan 52 which is splined thereon. The line 16 which is being reeled off is passed at least one turn around the capstan 52 and hence as the line is dispensed the capstan is turned. The inner end of spindle 51 extends through the gear-casing 46 and carries bushings 50 received in bosses 53. Parallel to spindle 51 and on the other side of gear casing 46 with respect thereto is a counter-shaft 54 likewise carrying bushings 55 received in bosses 56. Spindle 51 carries pinion 57 splined thereon which meshes with the larger gear 58 of first compound gear 58—59 loose on counter-shaft 54. The smaller or pinion part 59 of first compound gear 58—59 meshes with the larger gear 61 of second compound gear 61—62 loose on spindle 51. The smaller or pinion gear 62 of second compound gear 61—62 meshes with the larger gear 63 of third compound gear 63—64 on counter-shaft 54. The pinion 64 of third compound gear 63—64 meshes with the larger gear 66 of fourth compound gear 66—67 loose on spindle 51, and the pinion 67 of fourth compound gear 66—67 meshes with large gear 68—69 loose on counter-shaft 54. Large gear 68—69 comprises a spur gear portion 68 and a bevel gear portion 69. The bevel gear portion 69 meshes with bevel gear pinion 71 which is attached to the lower end of stub shaft 72, the upper end of which projects up through the boss 47 centrally of dial 48. The internal boss 73 on boss 47 is hollow and contains spring 70 which bears against shoulder 75 on shaft 72 and thus biases pinion 71 in engagement with bevel gear 69. As will be observed from Figs. 3 and 4, a very considerable gear reduction is effected between capstan 52 and stub shaft 72 so that the angular rotation of stub shaft 72 for each revolution of capstan 52 is very materially reduced.

The upper end 76 of stub shaft 72 is splined and fixed to knurled crown 77 which carries dial 78 carrying indicator markings 48 cooperating with pointer 49. Dial 78 can easily be reset by pulling crown 77 upwardly and proper setting made, whereupon the crown 77 is pushed down again on stub shaft 72. There is sufficient clearance between the upper end of bevel pinion 71 and boss 73 to permit raising of pinion 71 from engagement with bevel gear 69 to allow resetting. Spring 70 re-engages gears 69 and 71 when crown 77 is released.

One of the features of the invention is the fact that the casing 46, capstan 52 and all of the gears are of plastic. This materially reduces the noise which would otherwise be occasioned as the various gears revolve and further reduces the problems of lubrication.

In operation, the line 16 wound around reel 12 and passing through guides 17 to the tip of the rod is wound for at least one turn around capstan 52. As the line is payed out from reel 12, it causes the capstan 52 to revolve and the number of revolutions of capstan per foot of line payed out is constant, inasmuch as the quantity of line on reel 12 in no way determines the turning of the capstan. By means of the gear train heretofore described, the movement of the capstan 52 results in rotation of dial 48 and this is read by pointer 49 since turning dial 48 is directly proportional to the circumference of capstan 52. To change the readings of dial 48 from yards to meters, or other lineal measurements, capstans 52 of different diameters may be employed.

After the line has been payed out, it may be slipped off the capstan 52 without difficulty so that when a strike is made the reel 12 may be wound without encumbrance from the measuring device. Resetting of the dial 48 can be readily accomplished by raising the crown 77 until gears 69 and 71 are disengaged and then resetting the same.

The device is conveniently installed and removed from a rod 11. The nuts 33 are removed, permitting clamp arm 21 to swing down about hinge 23 so that the rod can be inserted between the clamp arm 21 and arm 22. If the diameter of the rod 11 is such as to require it, the adapter 41 is slipped over the rod. Nuts 33 are tightened against sockets 36 on clamp arm 21 to press ridge 38 against the rod or adapter and thus clamp the same in place. Ridges 39 prevent movement of the casing in a longitudinal direction.

Although the foregoing invention has been described in some detail by way of illustration and example for purposes of clarity of understanding, it is understood that certain changes and modifications may be practiced within the spirit of the invention and scope of the appended claim.

What is claimed is:

A line measuring device comprising a casing, a shaft journalled in said casing, a capstan on said shaft on the exterior of said casing, indicating means operable by rotation of the capstan, and clamping means comprising an L-shaped bracket having a first arm projecting out from said casing parallel to said capstan and a second arm extending substantially perpendicular to the outer end of said first arm, said second arm being apertured adjacent its outer end, a clamp arm having one end shaped to fit in the aperture of said second arm and extending back toward said casing substantially parallel to said first arm, and threaded means engaging said first arm and said clamp arm arranged to adjust the distance between said first arm and said clamp arm to clamp a rod therebetween.

References Cited in the file of this patent

UNITED STATES PATENTS

| | | |
|---|---|---|
| 1,478,910 | Perkins | Dec. 25, 1923 |
| 2,203,984 | Deters | June 11, 1940 |
| 2,536,969 | Turner | Jan. 2, 1951 |
| 2,637,112 | La Fontaine et al. | May 5, 1953 |

FOREIGN PATENTS

| | | |
|---|---|---|
| 118,982 | Great Britain | Sept. 19, 1918 |
| 573,747 | Germany | Apr. 5, 1933 |